Nov. 8, 1938.     H. H. LEE     2,135,722
DRIVE TRANSMISSION MEANS FOR MOTOR-ROAD VEHICLES
Filed May 22, 1937     2 Sheets-Sheet 1

Horatio Henwood Lee
INVENTOR

By Otto Munk
his ATT'y.

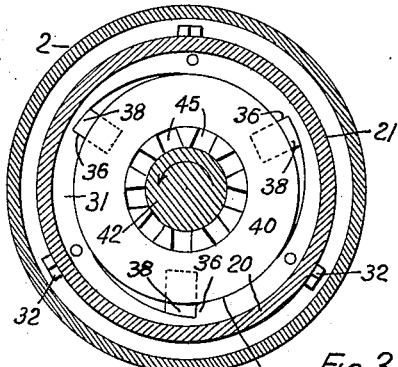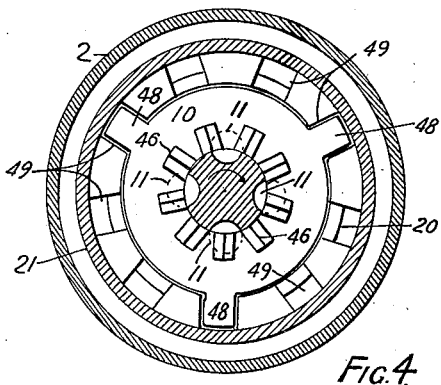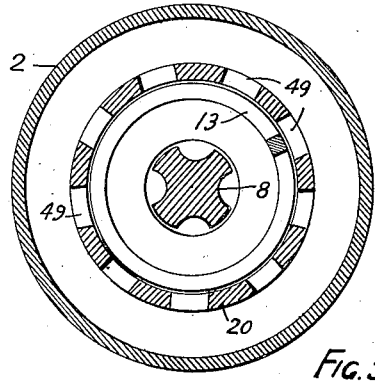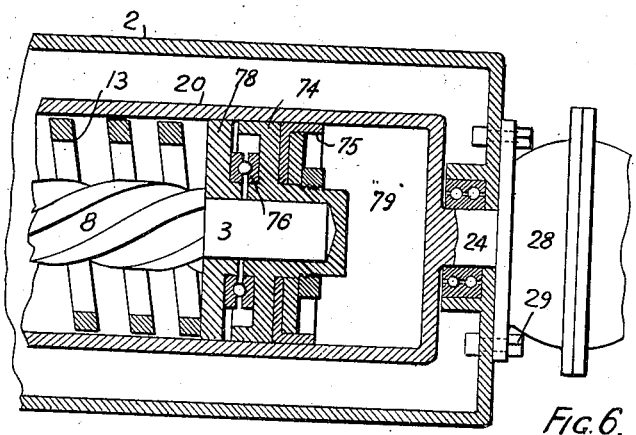

Patented Nov. 8, 1938

2,135,722

UNITED STATES PATENT OFFICE 2,135,722

DRIVE TRANSMISSION MEANS FOR MOTOR-ROAD VEHICLES

Horatio Henwood Lee, Double Bay, near Sydney, New South Wales, Australia

Application May 22, 1937, Serial No. 144,199
In Australia June 10, 1936

7 Claims. (Cl. 192—48)

This invention relates to drive transmission means for use with motor-road vehicles, the construction, arrangement, and operation of which are such that power from the power driving means is conveyable to the driven means without imparting shock to the latter.

Referring to the accompanying drawings in which the invention is illustrated,

Figure 1:
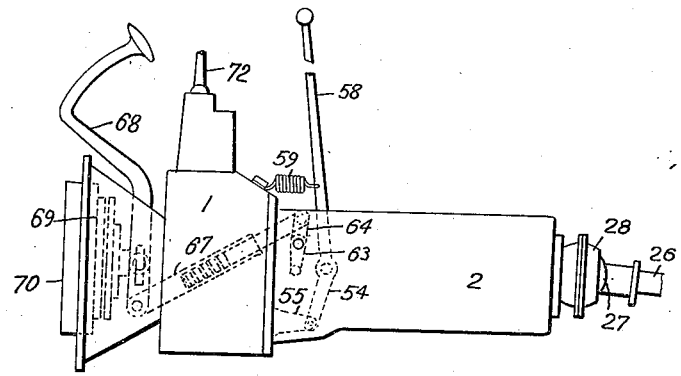
Fig. 1 is a diagrammatic view of the drive transmission means shown associated with a conventional gear box.
Figure 2:
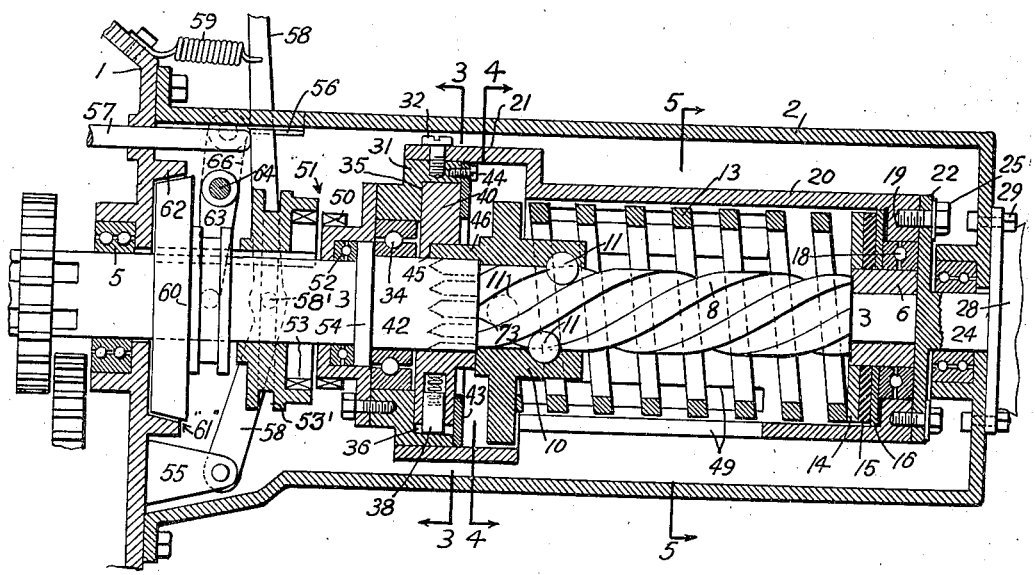
Fig. 2 is a longitudinal central section of said means.

Figs. 3, 4 and 5 are cross-sections on lines 3—3, 4—4 and 5—5 respectively of Fig. 2; and Fig. 6 is a central longitudinal section of a modified construction of cushioning means for the said drive transmission means.

To one end of the gear box 1 is affixed a cylindrical housing 2 into which projects the direct driving shaft 3 of the gear box 1. Shaft 3 has oppositely disposed bearings 5 and 6; the former is located in the gear box 1, and the latter is located within and at the rear end of a cylindrical casing 20. Such casing 20 is enclosed within the cylindrical housing 2. One portion of the shaft 3 is furnished with a quick acting screw-threaded portion 8 which is adapted to have associated therewith a nut 10, which is threadably connected to the screw-threaded portion 8 of the shaft 3 by helically disposed balls 11 carried by the nut 10. A compressible coil spring 13 abuts at one of its ends the nut 10, and the other end of the spring 13 abuts one face of a metal disc 14; the latter is slidably mounted on the bearing 6, for the shaft 3. The other face of the disc 14 abuts one face of a resilient disc 15 which may be of rubber or other suitable material and is located between the disc 14 and another metal disc 16; the latter is also slidably mounted upon the bearing 6 and is adapted to abut one face of a thrust bearing 18, within an annular shoulder 19 of the cylindrical casing 20, the other face of the thrust bearing 18 abutting the cover 22 at the rear end of the casing 20.

Cover 22 is formed integrally with a stub axle 24, and is rigidly affixed to the casing 20 by screw bolts 25. Said stub axle 24 is connected to the Cardan shaft 26 of the motor-road vehicle by the universal joint 27 in well known manner, while the housing 28 for the universal joint 27 is affixed to the rear end of cylindrical housing 2 by bolts 29.

The casing 20 also encloses the coil spring 13, and is enlarged at its forward end 21 and is secured to a collar 31 by screws 32. Collar 31 is rotatably mounted on the ball bearing 34 and is provided with an annular housing 35, the internal face of which is furnished with spaced ratchet teeth 36 into which are adapted to engage spaced spring loaded pawls 38.

The pawls 38 are radially disposed in the periphery of a hub 40 located within the annular housing 35; hub 40 is loosely mounted upon an enlargement 42 of the shaft 3 and it is held within the annular housing 35 by the ring 43 which is secured to the collar 31 by screws 44. The hub 40 at its rear end is provided with a plurality of radially disposed housings 45 into which are adapted to project and engage a plurality of radially disposed lugs 46 formed integrally with the forward end of the nut 10 and having chiselled shaped points to facilitate entry of the lugs 46 into the recesses 45, such entry being further facilitated through hub 40 having pawls 38 which are cooperable with the ratchet teeth 36 on the internal face of the collar 31. Nut 10 is also provided on its periphery with a plurality of radially disposed projecting lugs 48 adapted to slide in a plurality of spaced longitudinal slots 49 in the cylindrical casing 20 between its enlargement 21 and its rearward end.

Rigidly affixed to the annular collar 31 is a male member 50 of a clutch 51, such member 50 surrounding the shaft 3 and adapted to bear against a thrust ball bearing 52 which abuts a collar 54 formed on the shaft 3.

The male member 50 of the clutch 51 is adapted to engage with the female member 53 which is non-rotatably and slidably mounted upon the shaft 3. Member 53 is controllable by a hand lever 58 which is fulcrumed on the bracket 55, which is affixed to the rear of the gear box 1, said lever 58 having a lug 58' which works in an annular groove 53' of the member 53. Lever 58 projects into the head of the cylindrical housing 2 through a slot 56 and is held in normal position by the extensible coil spring 59 one end of which is attached to the lever 58 and the other end thereof to the gear box whereby the clutch members 50 and 53 are normally held apart to keep the clutch member 53 disengaged from member 50. Lever 58 is only operated against tension of the spring 59 when shock absorbing means herein described are to be thrown out of action to enable reverse driving of the motor vehicle to be accomplished. In such latter operation the member 53 is slid on the extension of the shaft 3 to engage with the clutch member 50 on the roller 31. The rear end of a slidable rod 57 is adapted to engage with the lever 58; such rod 57 projects into the housing 2 from the gear box 1 and is affixed at one end to the gear shift bar associated with the reversing mechanism in the gear box 1, whereby when the change gear lever 72 is operated into reverse position the rod 57 will contact with and press against the hand lever 58, thereby moving the clutch member 53 on the extension of the drive shaft 3 into engagement with the clutch member 50 on the collar 31.

Slidably and non-rotatably mounted upon the shaft 3 is a male member 60 of a cone brake 61 which is adapted to engage with the female member 62 thereof, the latter being formed integrally with the gear box 1. The male member 60 is operable by a radial arm 63 secured upon a spindle 64 having bearings in the wall of the cylindrical housing 2. Also affixed to the spindle 64 is a radial arm 66 which is connected by the link 67 to the main clutch pedal 68. Such pedal 68 operates the main clutch 69 associated with the fly-wheel 70 of the motor-road vehicle.

Referring to Fig. 6, instead of using a resilient disc 15 as before described, modified cushioning means for the drive transmission means of the motor-road vehicle consists in providing a plunger piston 74 which is loosely mounted on the rear end of the shaft 3; such piston 74 is furnished on its rear face with an expansible washer 75. At the forward face of the piston 74 is a thrust bearing 76 forwardly of which is an abutment disc 78 for the rear end of the spring 13. The rear end of the cylindrical casing 20 forms a chamber 79 for reciprocation therein of the plunger piston 74 whereby the said piston when moved rearwardly will compress air in the rear end of the cylindrical casing 20.

In operation, the engine of the motor-road vehicle is started in usual manner and at the usual time; before operating the gear change lever 72, the main clutch 69 is thrown out by depressing the pedal 68. The gear change lever 72 having been operated, the main clutch 69 is engaged whereby the shaft 3 is thus allowed to be rotated through the engine shaft of the motor-road vehicle. As the coil spring 13 presses against the nut 10 and the latter presses against the shoulder 73 of the enlargement 42 on the shaft 3 the nut 10 is held firmly against such shoulder 73 whereby the hub 40 can be rotated through the lugs 46 on the nut 10 engaging the recesses 45 in such hub. The hub 40 rotates until the pawls 38 engage with the ratchet teeth 36 and thereby further rotation of the hub 40 is prevented, and the radial lugs 48 on the nut 10 are brought into alignment with the slots 49 of the cylindrical casing 20. The nut 10 will now move rearwardly away from the hub 40, as the shaft 3 continues to rotate through the helical screw 8 operating on the balls 11 of the nut 10. Nut 10 will continue to move rearwardly within the cylindrical casing 20 and in doing so will compress the coil spring 13 until the torque of the Cardan shaft 26 is overcome; then the shaft 3, cylindrical casing 20 and Cardan shaft 26 through the universal joint 27 will rotate together. By the means described the torque of the Cardan shaft 26 is gradually taken up.

The resilient disc 15 or the plunger piston 69 will act to prevent any jarring effects to the coil spring 13 at the rear end of the cylindrical casing 20.

When the torque of the Cardan shaft 26 overcomes that of the shaft 3 the nut 10 will return to its forward position in the cylindrical casing 20 to again make engagement with the hub 40; the said return of the nut 10 is effected through expansion of the coil spring 13. The motor-road vehicle will now move in a free-wheel manner, but as soon as the torque on the shaft 3 increases then similar action of the nut 10 will take place to that before described.

So that the motor-road vehicle can be driven in reverse direction, the said shock absorbing means must be thrown out of action, otherwise reverse driving movement of the motor-road vehicle cannot be accomplished. Reverse movement is given to the motor-road vehicle by operation of the gear change lever 72, the latter in its operation moving the slide rod 57, which in turn operates the lever 58, whereby the clutch member 53 will be made to engage with the clutch member 50, with the result that the shaft 3 will be directly coupled to the Cardan shaft 26, that is to say, that the casing 20 will be locked to the shaft 3. Instead of the rod 57 being so operated, the clutch member 53 can be placed in engagement with the clutch member 50 by manually operating the lever 58 to effectuate the same result.

By the provision of the brake means 60—62 herein described in connection with the drive transmission means of a motor-road vehicle starting of the latter upwardly on a hill is easily accomplished and gear changing is facilitated.

Such is accomplished in the following manner—the main clutch pedal 68 is depressed whereby the main clutch 69 is disengaged from action, but through the link 67 the cone brake 60 is engaged with the female member 62. The gear lever 72 having been operated so that the selected gears within the gear box are in engagement, the brakes on the vehicle are released; the vehicle, however, is prevented from running backward as the brake 61 is in engaged position, whereby the shaft 3 is held stationary. As the main brake 69 is allowed to become engaged, the brake 61 is allowed to become disengaged, with the result that the motor-road vehicle can be started for uphill driving in easy manner.

In gear-changing, when the main clutch 69 is held in disengaged position the brake 61 will be in engaged position, with the result that the shaft 3 will be held stationary against rotation; therefore gear-changing is easily accomplished.

What I claim as my invention and desire to secure by Letters Patent is:—

1. Drive transmission means for motor-road vehicles characterized in that the direct drive shaft of the gear box of the vehicle has an extension projecting into a cylindrical casing whose side walls have a plurality of spaced longitudinal slots disposed therein between the forward and rear ends thereof, bearings for said extension at both ends thereof, a quick acting screw-thread on portion of said extension, a nut threadably connected to said portion and reciprocable thereon, cushioning means at the rear of said casing, a compressible coil spring between said nut and said cushioning means, a hub loosely mounted on said extension with a plurality of spaced radially disposed recesses in the rear portion thereof, a plurality of spaced radially disposed lugs on the forward face of said nut adapted when said nut is contiguous to said hub to engage with said recesses, a plurality of spaced radially disposed lugs on the periphery of said nut adapted to engage with the longitudinal slots in said casing, an annular collar secured to said casing at the forward end thereof and surrounding said hub and shaft, the internal face of said collar having a plurality of spaced ratchet teeth therein, a plurality of spaced spring loaded pawls disposed in the periphery of said hub adapted to engage with said ratchet teeth, a driven shaft rotatably associated with said casing, and a member of clutch connectable means slidable on said extension and engageable with a co-operable member on the forward face of said collar, the said drive transmission means being adapted on forward drive of the vehicle to allow said nut to compress the said spring until the torque of said driven shaft is overcome when said drive shaft, casing and driven shaft will rotate together and said means being also adapted upon cooperative action of said clutch members for reverse drive of the vehicle the said drive shaft will be directly coupled to said driven shaft through the said drive shaft and casing being locked together.

2. Drive transmission means according to claim 1, in which the nut is threadably connected to the screw-thread on the drive shaft extension by a plurality of helically disposed balls the said balls being carried by the said nut, the latter in its movement on said extension rearwardly within the cylindrical casing being adapted to compress the coil spring until the torque of the driven shaft is overcome, when the driving shaft and said casing and said driven shaft will rotate together, the said nut being also adapted to be automatically returned to normal forward position thereof on said extension through expansion of the said coil spring when the torque of the said driven shaft overcomes the torque of the said driving shaft.

3. Drive transmission means according to claim 1, in which the collar has attached to its rear face a ring to hold the hub in position within the collar and the latter has also attached to its forward face the co-operable member of the clutch means the latter being supported on the drive shaft extension, and the other member of said clutch being slidable on said extension.

4. Drive transmission means according to claim 1, in which the cushioning means disposed in the rear end of the cylindrical casing are carried on a bearing in said casing for the rear end of the drive shaft extension, said cushioning means comprising two metal discs between which is a resilient disc.

5. Drive transmission means according to claim 1, in which the cushioning means in the rear end of the cylindrical casing consist of a plunger piston backed with an element expansible in relation to the longitudinal walls of said casing, the said plunger piston when moved rearwardly in said casing being adapted to compress air in the rear end of said casing.

6. Drive transmission means according to claim 1, in which a male member of a brake is slidably and non-rotatably mounted upon the drive shaft extension, a stationary female member of said brake is disposed on the exterior face of the rear side of the gear box, and means are provided operatively connecting the said male member with the main clutch pedal of the vehicle, whereby when the said clutch pedal is in disengaged position the said male member will be in engaged position in relation to the said female member and the said drive shaft will be held stationary and starting of the motor-road vehicle upwardly on a hill is readily accomplished and gearchanging is facilitated.

7. Drive transmission means according to claim 1, in which a male member of a cone brake is slidably and non-rotatably mounted upon the drive shaft extension, a stationary female member of said brake is disposed on the exterior face of the rear side of the gear box, a radial arm is provided on a spindle having bearings in the longitudinal walls of a casing attached at its forward end to said gear box the said casing enclosing said drive shaft extension and its associated drive means, the said arm being also associated with said male member and a second radial arm is affixed to the said spindle and connected by a link to the main clutch pedal of the vehicle, the said male member being adapted when operated through said clutch pedal being placed in disengaged position to engage with the said female member to hold said drive shaft stationary.

HORATIO HENWOOD LEE.